(12) United States Patent
Simmons

(10) Patent No.: US 7,887,696 B1
(45) Date of Patent: Feb. 15, 2011

(54) ORGANIC REMINERALIZER REACTOR

(75) Inventor: Paul L. Simmons, Clearwater, FL (US)

(73) Assignee: CWP Holdings, LLC, Ft. Myers, FL (US)

( * ) Notice: Subject to any disclaimer, the term of this patent is extended or adjusted under 35 U.S.C. 154(b) by 0 days.

(21) Appl. No.: 12/592,983

(22) Filed: Dec. 7, 2009

Related U.S. Application Data

(60) Provisional application No. 61/201,410, filed on Dec. 11, 2008.

(51) Int. Cl.
*B01D 17/12* (2006.01)
(52) U.S. Cl. .......................... 210/85; 73/866.5; 210/90; 210/96.1; 210/103; 210/149; 210/192; 210/202; 210/257.1; 422/186.07; 422/186.14
(58) Field of Classification Search .................. 210/85, 210/90, 95, 96.1, 97, 134, 143, 149, 175, 210/198.1, 199, 205, 257.1, 259, 263, 282, 210/192, 202; 426/66, 74; 423/580.1; 203/10; 202/176; 99/275; 73/866.5; 422/186.07, 422/186.08, 186.1, 186.14
See application file for complete search history.

(56) References Cited

U.S. PATENT DOCUMENTS

| | | | | |
|---|---|---|---|---|
| 4,599,166 | A | * | 7/1986 | Gesslauer .................. 210/96.1 |
| 5,468,373 | A | * | 11/1995 | Chou ........................... 210/94 |
| 5,910,233 | A | * | 6/1999 | Berg et al. ..................... 203/10 |
| 5,958,228 | A | * | 9/1999 | Tokushima et al. .......... 210/199 |
| 6,936,179 | B2 | * | 8/2005 | DeWald ....................... 210/760 |
| 2002/0060175 | A1 | * | 5/2002 | Conrad et al. ................. 210/85 |
| 2007/0100134 | A1 | * | 5/2007 | Lepetitcorps et al. ....... 530/422 |
| 2009/0173616 | A1 | * | 7/2009 | Cabados et al. ............. 202/176 |

OTHER PUBLICATIONS

Derwent Abstract of Publication CN 101228915, Published Jul. 30, 2008; Author: Ding.*
Derwent Abstract for Document JP 62-4494, Jan. 1987, downloaded from EAST, Dec. 1, 2010.*

* cited by examiner

*Primary Examiner*—Joseph W Drodge
(74) *Attorney, Agent, or Firm*—Dennis L. Cook, Esq.

(57) ABSTRACT

This disclosure describes a commercial/industrial remineralizer designed to be added to a purification system that raises the pH by non-chemical methodology while replacing important electrolytes to the water that were extracted along with the toxic, non-essential minerals from the water. The remineralizer can be designed for heavy commercial continuous production.

6 Claims, 2 Drawing Sheets

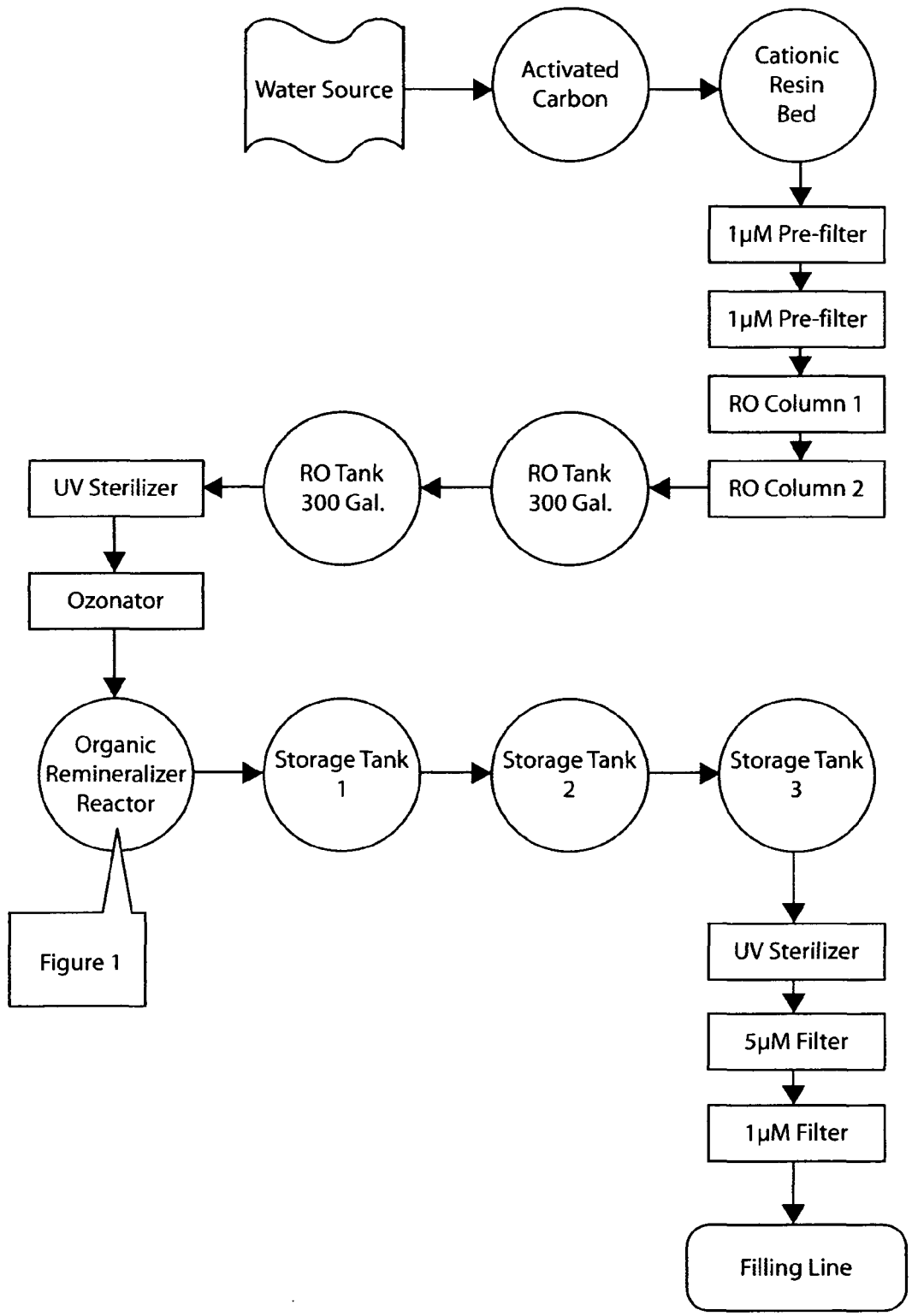

ORGANIC REMINERALIZER REACTOR

CROSS-REFERENCE TO RELATED APPLICATION

The present application claims the benefit of previously filed co-pending Provisional Patent Application Ser. No. 61/201,410.

FIELD OF THE INVENTION

This invention belongs to the field of commercial/industrial remineralizers designed to be added to a water purification system and more specifically a remineralizer that raises the pH by non-chemical methodology while replacing important electrolytes to the water that were extracted along with the toxic, non-essential minerals from the water. The remineralizer can be designed for heavy commercial continuous production.

BACKGROUND OF THE INVENTION

For many years, scientists, nutritionists and medical doctors have realized that most of the drinking water purification methodologies in use today leave the water barren of many of the natural minerals needed by the body. Most, if not all, also produce acidic or dead water with a pH of less than 7.

For the past 25 years there have been many attempts to design a commercial/industrial system that can remineralize drinking water and raise its pH to an alkaline state without the use of harsh chemicals.

There are dozens of household systems that can accomplish this on a temporary basis although there is no control over key process variables that can assure dependability and repeatability. These attempts include small packets of various natural minerals that have been used to provide some of the electrolytes and raise the pH of one glass of water at a time.

The invention of this disclosure has proven to be capable of producing drinking water that is pure and alkaline on a repeatable basis in unlimited quantities.

This commercial/industrial remineralizer is designed to be the final step in a continuous treatment process which has the capability to control the key process variables to assure that the end results are achieved on a repeatable basis. The unit can be sized to fit the needs of the production process from 5 gpm to 200 gpm (and above) if the pretreatment portion of the system is properly sized. It requires only one readily-available natural mineral, crystal coral medium, and has the proper controls to assure that the natural medium maintains the required quality until it is totally absorbed by the acidic water that comes from the pretreatment portion of the system.

One of the very desirable features of the disclosed remineralizer is that the feeder portion of the system can be designed to accept water of various qualities; this includes municipal water, well water, brackish water from lakes or ponds or even salt water. As the worlds' water supply decreases it is forecast that water will become more critical than oil. Treatment systems that can purify water from contaminated sources will be an absolute necessity. This technology is designed to serve that need economically.

Previous patents that describe the general nature of the art include:

1. U.S. Pat. No. 2,374,805 issued May 1945 to Camelford
2. U.S. Pat. No. 3,675,442 issued July 1972 to Swanson
3. U.S. Pat. No. 4,146,372 issued March 1979 to Groth, et al.
4. U.S. Pat. No. 4,204,956 issued May 1980 to Flatow
5. U.S. Pat. No. 5,106,512 issued April 1992 to Reidy
6. U.S. Pat. No. 5,517,829 issued May 1996 to Michael
7. U.S. Pat. No. 7,303,666 issued December 2007 to Mitsis
8. U.S. Pat. No. 3,365,061 issued January 1968 to Bray
9. U.S. Pat. No. 7,507,334 issued May 2009 to Sigona
10. U.S. Pat. No. 7,597,784 October 2009 to Bednarek

BRIEF SUMMARY OF THE INVENTION

A commercial/industrial remineralizer designed to be added to a purification system that raises the pH by non-chemical methodology while replacing important electrolytes to the water that were extracted along with the toxic, non-essential minerals from the water. The remineralizer can be designed for heavy commercial continuous production.

BRIEF DESCRIPTION OF THE DRAWINGS

For a fuller understanding of the nature and objects of the invention, reference should be made to the following detailed description, taken in connection with the accompanying drawings, in which:

FIG. 2 shows a typical flow diagram schematic for the Organic Remineralizer Reactor in a filling system using reverse osmosis as a pretreatment before the remineralizer and a typical storage system that feeds several fill lines for commercial filling.

DESCRIPTION OF THE PREFERRED EMBODIMENT

Figure 1:
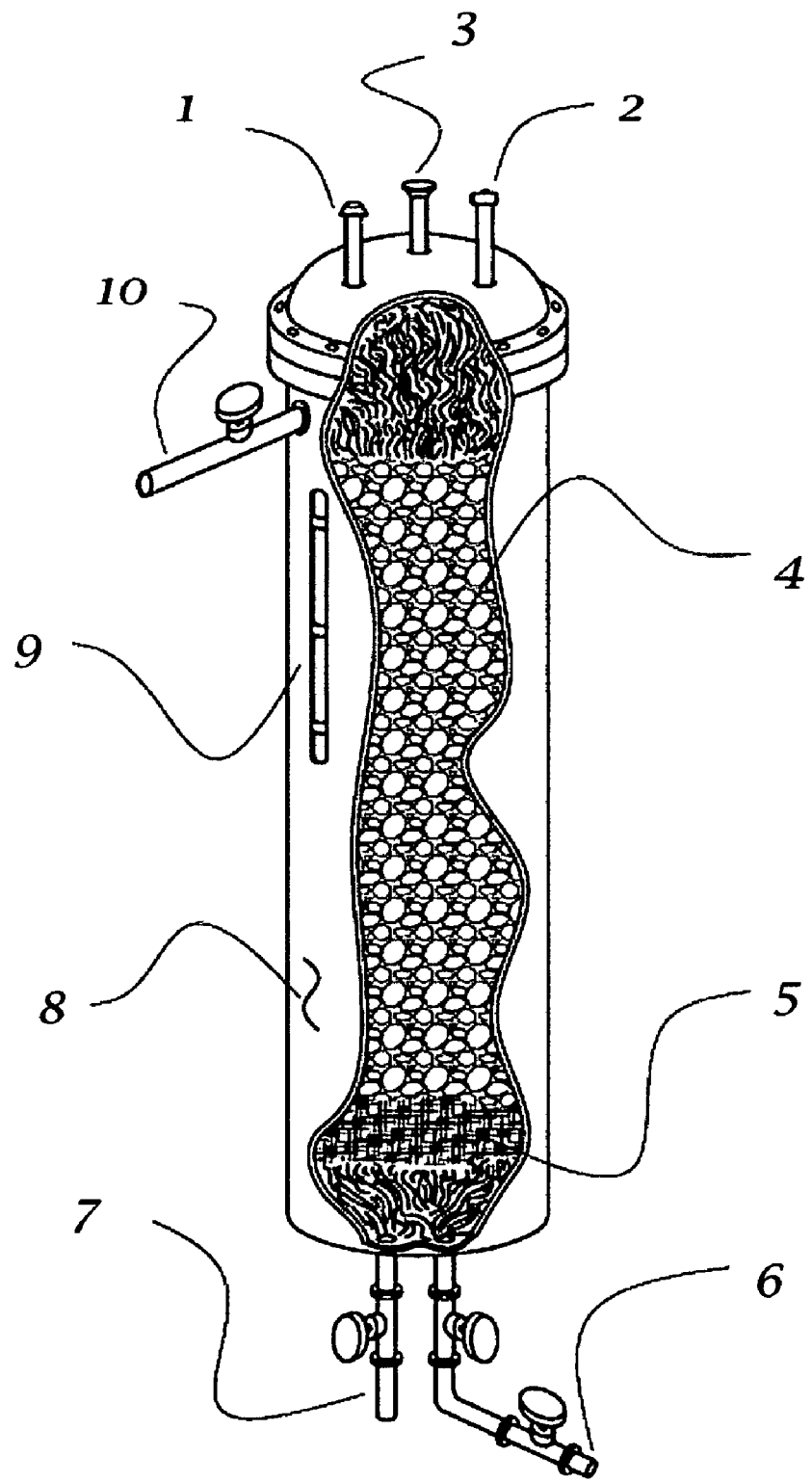
FIG. 1 shows the Organic Remineralizer Reactor as it appears after the pretreatment system and before the bulk storage tank.

Referring now to FIG. 1 the legend for the drawing is:
1: pH controller
2: pressure controller
3: temperature controller
4: coral media
5: support screen
6: inlet from pretreatment system
7: reactor drain
8: tank, material 316 stainless steel
9: reactor sight glass
10: outlet to bulk storage The subject of the invention is an organic commercial/industrial remineralizer designed to remineralize reverse osmosis, distilled, or ultra-filtered drinking water after it has been purified by the methods aforementioned.

The remineralizer can be designed with output capacities from 5 gpm to 200 gpm (and above); the tank (8) design is based on a 4 to 1 ratio height to width, is constructed of 316 Stainless Steel, and can only function as a final step in a purification process as shown in FIG. 2.

In operation pretreated water flows in to the inlet (6) through a valve at the bottom of the cylindrical tank (8) and, at the speed of gravity, flows through the coral media (4) resting on a support screen (5), which has a critical crystal size purchased direct from Okinawa, Japan, based on the crystal sizing of $1/56$ to $1/16^{th}$ of an inch. The remineralized water then flows out through an outlet (10) at the top of the tank (8) to a storage tank (shown in FIG. 2) properly equipped to maintain sterility and temperature during the storage period.

The pretreatment process shown in FIG. 2 must remove all the heavy metals and toxic or poison chemicals to prevent contamination of the coral media (4). Once the coral media (4) is contaminated, it cannot be reconstituted.

As the pretreated water flows from the bottom to the top of the remineralizer tank (8), it absorbs the natural minerals from the coral media (4) along with unidentified electrolytes. The velocity of the water flowing over the crystal coral media (4) determines the amount of minerals absorbed as well as the final pH of the effluent. The amount of coral media (4) in the tank (8) can be monitored by a reactor sight glass (9) mounted in the tank (8). Ozone gas introduced at the inlet (6) speeds up the absorption process. The pH controller (1) located at the top of the reactor regulates the amount of ozone gas introduced into the system.

Lead and other heavy metals normally found in municipal water and many wells, if allowed, will form a coating over the surface of the crystal coral media (4) and prevent absorption of the coral media (4) into the water.

If the water entering the reactor is not sterile, the reactor can become grossly contaminated over 24 hours resulting in the total loss of the coral media (4).

The unit is designed for continuous operation and, if shut down, must be drained by the reactor drain (7) and the unit sealed by closing both the inlet (6) and outlet (10) valves.

The key process variables listed below are critical to the successful maintenance of quality water. Those key process variables are: temperature (approximately 70 degrees F.) monitored by the temperature controller (3), pressure (0 to 1 psi at top) monitored by the pressure controller (2), pH (4.3 to 6.3 at the inlet (6) and 7.8 to 9.4 at the outlet (10)) monitored by the pH controller (1); ozone (approximately 2 mb per second) regulated by the pH controller (1); and those that must be monitored by daily chemical lab testing (lead, mercury, arsenic, copper, sodium and chloramines).

As proof of the effectiveness of the remineralizer disclosed herein there are two water test reports cited in the table below, one from a typical municipal source and the other from an independent test by an FDA approved laboratory using approved protocols of the finished remineralized water product.

Reference from 2007 Annual Water Quality Report, City of Pinellas Park, Fla., Pinellas County Utilities municipal water supply, source water before entering pretreatment system in advance of the Organic Remineralizer Reactor. A study of municipal water systems around the US indicates that this is typical.

| | |
|---|---|
| Chloramines | 2.7 ppb |
| Lead | 0.11 ppb |
| Copper | 0.593 ppm |
| Arsenic | 0.31 ppb |
| Cyanide | 9.71 ppm |
| Sodium | 20.8 ppm |
| Haloacetic Acids | 20 ppb |
| pH | 7.0 |

Reference from NSF International Test Report, Jul. 24, 2007 water sample after processing through Organic Remineralizer Reactor

| | |
|---|---|
| Chloramines | ND ppm |
| Lead | ND ppm |
| Copper | 0.002 ppm |
| Arsenic | ND ppm |
| Cyanide | ND ppm |
| Sodium | 5.7 ppm |
| Haloacetic Acids | ND ppb |
| pH | 8.4 |

Key: ppm = parts per million, ppb = parts per billion, ND = none detected
Haloacetic Acids are disinfectants and disinfection byproducts used in disinfection of drinking water
All testing conducted by USEPA qualified laboratories in accordance with requirements established by the USEPA.

Since certain changes may be made in the above described remineralizer and remineralization process without departing from the scope of the invention herein involved, it is intended that all matter contained in the description thereof or shown in the accompanying figures shall be interpreted as illustrative and not in a limiting sense.

What is claimed is:

1. A remineralizer designed to organically remineralize and raise the pH of water after being treated by reverse osmosis, distillation, or ultra-filtration comprising a tank with an inlet at the bottom and an outlet at the top and said tank containing coral crystals over which reverse osmosis, distilled, or ultra-filtered water having a pH of 4.3 to 6.3 entering said remineralizer and 7.8 to 9.4 leaving said remineralizer flows, wherein said tank has monitors at the top for monitoring and controlling key process variables of temperature, pressure, and pH controlled by ozone levels.

2. The remineralizer of claim 1 wherein said tank has a size ratio of 1 width to 4 height.

3. The remineralizer of claim 2 wherein said coral crystals sizes are $\frac{1}{56}$ to $\frac{1}{16}^{th}$ of an inch.

4. The remineralizer of claim 3 wherein said tank has a sight glass mounted in said tank such that said sight glass provides a visible inspection of the amount of said coral crystals.

5. The remineralizer of claim 1 wherein the approximate values of said key process variables are a temperature of 70 degrees F., a pressure of 0 to 1 psi at the outlet of said tank, and an ozone level of 2 mb per second.

6. The remineralizer of claim 1 that is capable of monitoring and alarming if any one of said key process variables go out of predetermined limits.

* * * * *